United States Patent [19]

Hamilton

[11] Patent Number: 4,851,753

[45] Date of Patent: Jul. 25, 1989

[54] PROPORTIONAL MOTOR CONTROL CIRCUIT

[76] Inventor: Mark L. Hamilton, 5154 Camino Del Norte, Sierra Vista, Ariz. 85635

[21] Appl. No.: 206,882

[22] Filed: Jun. 15, 1988

[51] Int. Cl.$^4$ ............................................. G05B 11/36
[52] U.S. Cl. ..................................... 318/609; 318/681; 318/678; 318/258; 318/280; 354/74; 330/146
[58] Field of Search ............... 318/609, 681, 258, 678; 330/146; 354/74

[56] References Cited

U.S. PATENT DOCUMENTS

| | | | |
|---|---|---|---|
| 4,066,945 | 1/1978 | Korte, Jr. | 318/681 |
| 4,070,610 | 1/1978 | Rudich, Jr. | 318/678 |
| 4,319,170 | 3/1982 | Brent | 318/258 X |
| 4,528,514 | 7/1985 | Quackenbush | 330/146 |
| 4,720,805 | 1/1988 | Vye | 364/525 |

Primary Examiner—William M. Shoop, Jr.
Assistant Examiner—Saul M. Bergmann
Attorney, Agent, or Firm—Cort Flint

[57] ABSTRACT

A proportional control circuit for the direction and precise speed control of D.C. electric motors such as those used to drive camera tilt/pan mountings. The circuit applies current to D.C. motors in a push/pull proportional scheme whereby slewing speed is smoothly and precisely controlled and electromotive force provides motor braking. A single current source powers the motors through an "H" bridge switching amplifier arrangement responsive to the balance between two voltage dividers, one of which includes a controlling potentiometer that regulates both direction and speed.

16 Claims, 2 Drawing Sheets

PROPORTIONAL MOTOR CONTROL CIRCUIT

THE INVENTION

This invention relates to a proportional speed and direction controlling D.C. motor control circuit using a modified "H" bridge switching amplifier responsive to a voltage divider control means.

BACKGROUND OF THE INVENTION

Numerous D.C. motor control circuits are known but relatively few provide forward and reverse operation from a common current source. Those that do fail to provide current flow transition in a smooth, uniform fashion, causing the controlled motor to operate in an erratic fashion. This jerkiness is unacceptable when the motor is used to drive a video camera or similar device mounting whose primary purpose is to provide a smooth panning of an objective so that the end results are pleasing to an observer.

A basic approach to provide reversible control of a D.C. motor from a single power source is illustrated in U.S. Pat. No. 3,303,403 issued to J. Bonanno for "Power Controlling Device For A Remote Toy Equipped With A Reversible Electric Motor". This device uses a polarity reversing switch combined with a pair of potentiometers. It is inefficient and generally supplies current erratically, resulting in surging motor operation.

One well known reversible D.C. motor control circuit which avoids the need for a mechanical polarity reversing switch is known as the "H" switch bridge. It is comprised of four electronic switching devices generally shown schematically as two switching devices on either side of a common load. Typical examples of the device are the Motorola "H" switch power TMOS circuit or "H" switch Darlington circuit illustrated at Pages A-90 and A-91 of Motorola's Catalog of MOS-FET Circuit Data.

These "H" switch bridges are for a common load. They are adapted to allow current to flow in one direction or the other through the bridge and load in response to a means that mutually and exclusively turns on either of two pairs of the four power controlling switches.

R. Cruel in U.S. Pat. No. 3,378,740 on "Direct-Current Motor Control Circuit Employing A Parallel Damping Member" and T. Wakamiya in U.S. Pat. No. 4,210,851 on "Motor Control System" illustrate typical applications of the "H" switch bridge. They include a single transistor in each leg, thus limiting the size of the controlled motor to a relatively low powered device with little torque. They also fail to provide for a means to absorb the counter EMF created when motor speed and direction changes. This causes a jerky or erratic motor rotation transition. When a camera is driven by such a means, the results are not pleasing. Tilt and panning lacks the smooth flow in the resultant images that is usually associated with a person normally swiveling his head to view a scene.

OBJECTIVES OF THE INVENTION

In view of the inability of prior art motor control systems to provide a smooth transition to panning speeds from start to stop and reverse, the proportional motor control circuit disclosed herein has been developed to allow an operator to gradually increase the potential to a motor while simultaneously and uniformly enabling a ground return path for the motor so that it may be brought up to any desired speed in a smooth, uniform acceleration.

Another objective of the invention is to use and "H" bridge motor control circuit in combination with a complimentary dual bridge to smoothly decelerate the motor by electrodynamic braking.

A primary objective of this invention is to provide a simple transistor control circuit responsive to the balance between a fixed voltage divider network and a variable voltage divider network for proportionally controlling complimentary legs of an "H" bridge circuit using Darlington configured switching amplifiers.

Another objective is to provide a reversible motor control circuit which absorbs the current generated during coasting operation of the controlled motor to provide smooth electromotive force braking and motor rotation reversal.

A still further objective of the present invention is to provide a proportional motor control circuit which will allow smooth transition between start, stop and reverse motor operations in response to a potentiometer control input means.

Another objective of the invention is to provide a reversible motor speed control using a single current source motor power supply.

Another objective is to provide an "H" bridge switching amplifier control circuit for a D.C. motor in parallel with a diode bridge polled to couple current generated during coasting motor operation to the primary power source as a charging current.

It is a still further objective of the present invention to provide a pair of proportional motor control circuits adapted to control tilt and pan motions of a camera platform in response to operation of a pair of potentiometers responsive to a common control input such as found in a joy stick, track ball or mouse control device.

Another objective is to provide a variable bias potential for a Darlington amplifier bridge circuit by regulating the conduction of the interrelated complimentary transistor pairs.

SUMMARY OF THE INVENTION

The invention relates to a proportional motor control circuit that may be used to control a camera platform in a surveillance vehicle such as illustrated in FIG. 1. In the illustrated system, an infrared camera 28 or similar device is mounted on a control means 30 supported by a telescopic mast 12. With the camera in the raised, operating position, a joy stick or similar potentiometer type control or console 27 provides smooth, proportional regulation of current to tilt and pan motors. Each motor is controlled by an "H" configured switching amplifier bridge responsive to a voltage divider network. A diode bridge parallels each switching amplifier bridge to provide a current path for charging the power source with the current produced by the motor during coasting operation to provide dynamic braking.

DESCRIPTION OF THE INVENTION

Figure 2:
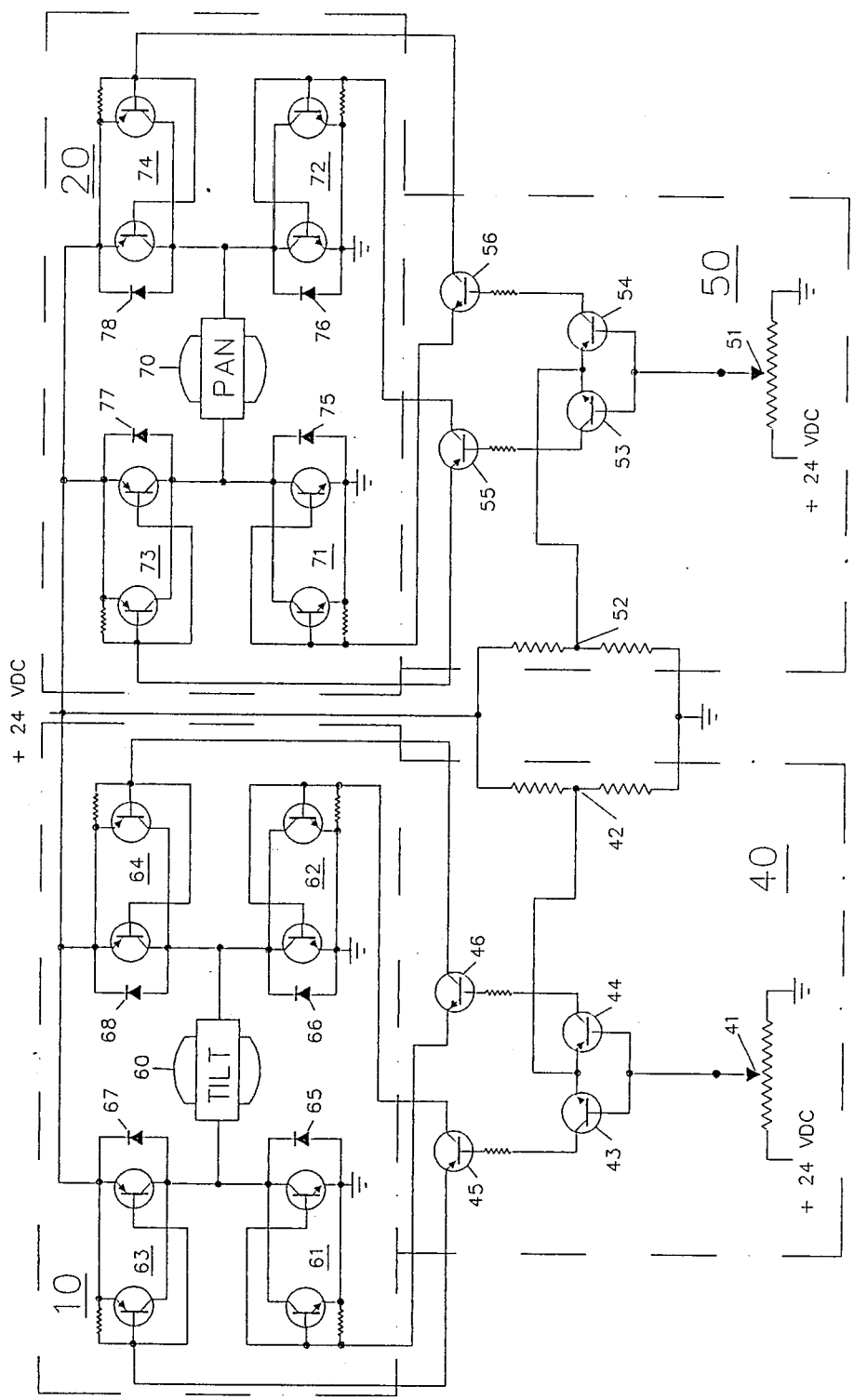
FIG. 2 is a schematic diagram illustrating both the tilt and pan D.C. motors and their associated "H" bridge control circuitry and proportional control input means.

FIG. 2 illustrates proportional motor control circuits for the tilt and pan motors employed to operate a remote camera platform. The tilt and pan motors, 60 and 70 respectively are D.C. motors each controlled by a voltage divider potentiometer 41 or 51 in combination with voltage divider networks 42 or 52. The voltage divider control circuits provide a variable D.C. potential to their respective "H" bridge switching amplifier control circuits. Because both tilt and pan circuits are identical, only one circuit will be discussed in detail to avoid repetition. Therefore, the following is a description of the proportional motor control circuit for the tilt motor 40.

The proportional motor control circuit consists of a proportional tilt "H" switching amplifier bridge circuit 60 and a proportional tilt control circuit 40. The control input for circuit 40 is the wiper 41 of any commercial potentiometer connected to function as a voltage divider. The wiper is connected to the bases of NPN transistor 43 and PNP transistor 44. The emitters of the transistors are joined together and to the center of voltage divider 42. The collectors of the transistors 43 and 44 are connected respectively to the bases of transistors 45 and 46.

The "H" switching amplifier circuit 10 consists of four Darlington amplifier switches: 63, 61, 64, and 62. Switch 63 consists of two PNP transistors in a typical Darlington configuration with bases, emitters, and collectors connectoed in parallel. Switch 61 consists of two NPN transistors also in a typical Darlington configuration. Switches 63 and 64 are identical as are switches 61 and 62. The bases of Darlington switching amplifiers 63 and 62 are controlled by the emitter and collector respectively by transistor 45. The bases of Darlington switching amplifiers 61 and 64 are controlled by the emitter and collector respectively of transistor 46. The collectors of Darlington switching amplifiers 61 and 63 are connected to the L terminal of the tilt motor 60. The R motor terminal is connected to the collectors of Darlington switching amplifiers 62 and 64.

When the potential at wiper 41 equals the potential of voltage divider 42, the circuit is inactive.

When the potential at wiper 41 is positive with respect to voltage divider 42, current flows from voltage divider 42 to the emitter of transistor 44, to its base and the wiper 41. This turns on transistor 44 and provides a positive potential at the base of transistor 46. When wiper 41 is negative in reference to the voltage divider 42, a negative potential is provided at the base of transistor 43. Current flows from the wiper 41 to the base of transistor 43 and from the emitter to voltage divider 42. This causes a positive potential at the collector of transistor 43.

Transistor 45 is turned on proportionally to the potential bias at its base supplied by the collector of transistor 43.

This provides a proportional input signal at the bases of Darlington switching amplifiers 62 and 63. This turns on Darlington 63 proportionally to the negative value at wiper 41. A negative potential is developed at the collectors of Darlington 62 which also increases proportionally with the negative value of wiper 41 with respect to voltage divider 42. This drives the tilt motor in the desired direction.

With a relatively positive potential applied at wiper 41, the proportional output of transistor 46 is reflected via its emitter at the bases of Darlington switching amplifier 61 and via its collector at the bases of Darlington switching amplifier 64. Thus a proportional positive potential is developed at motor terminal R and a proportional negative potential is developed at motor terminal L to drive the tilt motor in the opposite direction.

Figure 1:
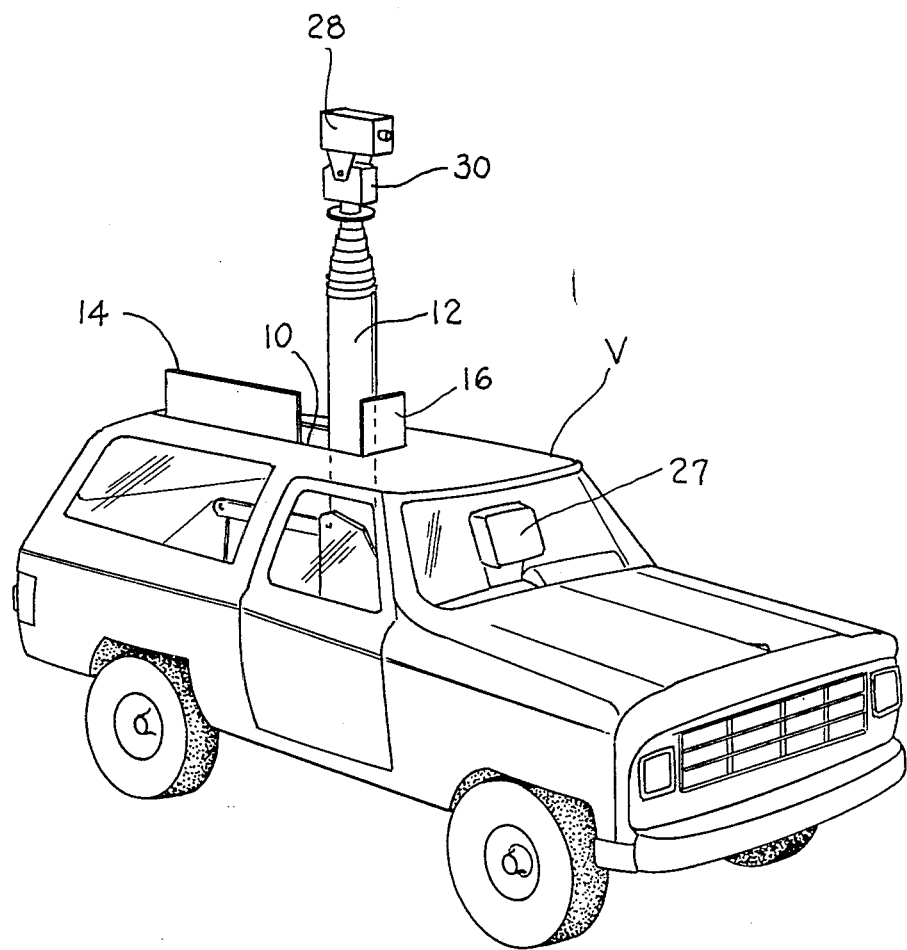
FIG. 1 is a ¾ view of a surveillance vehicle using the proportional motor control circuit of the subject invention.

As used in the surveillance vehicle illustrated in FIG. 1, the control for potentiometer 41 is installed as a joy stick in the control console 27, the effect of moving the joy sticks slightly in a forward direction causes a proportionally small positive signal at the wiper of 41 which turns on transistor 43 proportionally. This turns on transistor 45 which activates the tilt switching amplifier "H" bridge circuit 10 proportionally to turn on the tilt motor in proportion to the joy stice deflection. If the joy stick is moved still further, the positive potential on the wiper 41 will increase, turning the circuit on further to produce a proportional increase at 43 which will speed up the tilt motor proportionally. The current across the motor is the difference between the potentials developed at the collectors of the Darlington switching amplifiers.

A negative input at wiper 41 is created when the joy stick is moved in the opposite direction. This turns on transistors 44 and 46, switching on Darlington switching amplifiers 61 and 64 to produce proportional outputs at the motor but with a reverse polarity.

Thus, a proportional motor control circuit is provided where proportional signals of opposite polarity are produced at the output of a control circuit depending upon the direction and distance that a manually controlled potentiometer is moved. Transistors 43 and 44 are turned in a mutually exclusive fashion by positive or negative potentials to control the tilt motor accordingly.

The proportional pan "H" switching amplifier 20 and control circuit 50 are identical to the tilt circuits 10 and 40 previously described. Control potentials are developed in response to potentiometer wiper 51 which is controlled from the same manually controlled jou stick as used to control wiper 41 and located on console 27.

The tilt and pan motor control circuits function identically and may be controlled by a dual potentiometer such as may be found in a joy stick, track ball or mouse system. In this configuration, a tilt/pan camera support head may be controlled according to the following method of operation:

Potentiometers 41 and 51 of FIG. 2 are positioned as illustrated. The voltages developed across the potentiometers equal the voltages developed across the associated voltage divider networks 42 or 52. Thus, the potential of the base for transistors 43, 44, 53 and 54 equals the potential on the emitters of each of those transistors and both motors 60 and 70 are turned off. Transistors 43, 44, 53 and 54 are in an off configuration and their collectors hold transistors 45, 46, 55 and 56 respectively off through their connections to the bases of those transistors. With 45 and 46, and 55 and 56 in a non-conducting state, the four Darlington switching amplifiers of each proportional "H" control bridge, 10 and 20, are off and no current can flow through the tilt or pan motors 60 or 70. If potentiometers 41 and 51 are moved toward ground, transistors 44 and 54 begin conducting because the base of those NPN transistor will become more negative than their emitters. This turns on transistors 46 and 56 which turns on the Darlington pairs 64 and 61 in tilt circuit 10 and 74 and 71 in pan circuit 20. Current now flows through tilt and pan motors 60 and 70 in direct proportion to the voltage differential between the base and emitter of transistors 44 and 54.

The emitter of transistor 46 is connected to the base of both transistors in the Darlington switch 61 and cause that switch to turn on to provide a path to ground for the tilt motor 60 which conducts proportionally to the Darlington pair 64 which is turned on by the emitter to base connection between transistors 46 and 64. The Darlington switching amplifiers are not hard on/off circuits. They conduct in response to current flow through controlling transistors 45, 46, 55 or 56. Thus as potentiometer 41 is moved to a more negative position, current flow through transistor 46 increases and likewise, current flow through Darlington switches 61 and 64 increases to increase the speed of motor 60. If wiper 51 remains fixed during the movement of wiper 41 which cause the increase in tilt rate, the pan rate will remain constant.

If potentiometer 41 is now moved to the neutral position, transistors 44 and 46 are turned off and likewise Darlington switches 61 and 64 are placed in an off condition but the pan slew rate will continue until potentiometer 51 is set to its neutral position.

The inertia of the tilt motors cause the motors to continue to rotate after they have been switched off. This continued rotation generates electricity which is applied back to the D.C. source through the current path comprised of the diode bridges, diodes 65, 66, 67 and 68 for tilt motor 60 and diodes 75, 76, 77 and 78 for pan motor 70.

If potentiometer 41 is now placed towards the positive end of the voltage divider network that it creates, transistor 44 is held in an off condition but transistor 43 begins to conduct. This causes transistor 45 to conduct and Darlington switches 62 and 63 are turned on to cause the tilt motor 60 to rotate in an opposite direction to that experienced when the wiper was moved in the opposite direction in the first example. During this mode of operation, Darlington switches 61 and 64 are held off because transistor 46 is driven to an off condition. As soon as potentiometer 41 is returned to a neutral position, the diodes associated with these two Darlington switching amplifiers, diodes 65 and 68, complete a path for current through tilt motor 60 so that current generated by the motor, as the inertia of the rotor spins down, is applied back to the source to create an electromotive drag to smoothly bring the motor to a halt.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A proportional motor control circuit comprising:
   a first proportional voltage control and switching means for regulating current flow through a motor load to cause said motor to rotate in a first direction;
   a second proportional voltage control and switching means for regulating the ground return for said motor when said motor is operated in a first direction;
   a third proportional voltage control and switching means for regulating current flow through said motor load to cause said motor to rotate in a second direction;
   a fourth proportional voltage control and switching means for regulating the ground return for said motor when said motor is operated in a second direction;
   a diode oppositely poled and in parallel with said first switching means and a second diode oppositely poled and in parallel with said second switching means whereby current generated by the unenergized motor as it continues to spin in a first direction due to kinetic energy supplies said current to the system power source to thereby electromagnetically assist the deceleration of said motor;
   a fixed voltage divider network;
   a potentiometer electrically connected as a variable voltage divider network; and
   first and second switching amplifiers responsive to the difference voltage potential between said variable voltage divider network and said fixed voltage divider network for controlling the state and conductivity of said first, second, third and fourth switching means in proportion to said difference voltage so that said first and second switching means conduct in a mutually exclusive fashion with respect to said third and fourth switching means.

2. A motor control circuit as defined in claim 1 wherein said motor is a camera platform driving motor.

3. A motor control circuit as defined in claim 1, further comprising a second set of like elements for controlling a second motor adapted to drive the same object as said first motor.

4. A motor control circuit as defined in claim 3 wherein said driven object is a camera means.

5. A motor control circuit, comprising:
   a voltage divider network;
   a variable voltage divider network including a movable contact wiper for selecting a contact point on said variable voltage divider;
   a pair of complimentary transistors, the bases of which are electrically connected to said wiper and the emitters of which are electrically connected together and to a contact on said voltage divider network;
   a second pair of complimentary transistors, the bases of which are electrically connected to the collector of the complimentary transistor of said first complimentary transistor pair whereby the complimentary transistors of said second pair are non-conductive when the voltage potential at said wiper matches the voltage potential at the emitters of said first complimentary transistor pair and each transistor of said second complimentary pair conducts in a mutually exclusive fashion proportionally to the difference in potential between said wiper and said common emitter connection of said first complementary transistor pair;
   a four leg bridge circuit for controlling current flow through said controlled motor, each leg of said bridge circuit including transistors connected in a Darlington configuration, said Darlington transistors being of a conductivity type whereby bridge legs sharing common electrical connections are complimentary; and
   said second complimentary transistor pair electrically connected to different legs of said bridge such that the emitter of each of said second complimentary transistors is connected to the bases of the Darlington transistors in a different leg of said bridge network which are of the same conductivity type and the collectors of each of said second complimentary transistors are connected to the bases of the Darlington configured transistors of different legs of said bridge network arranged so that the legs of said bridge network connected to the collector circuits of a single transistor of said second complimentary pair of transistors do not share a common electrical connection.

6. A motor control circuit as defined in claim 5 wherein said motor is a camera platform driving motor.

7. A motor control circuit as defined in claim 5, further comprising a second set of like elements for controlling a second motor adapted to drive the same object as said first motor.

8. A motor control circuit as defined in claim 7, further comprising a second set of like elements for controlling a second motor adapted to drive the same object as said first motor.

9. A motor control circuit as defined in claim 5, further comprising a diode bridge circuit in parallel with said Darlington configured transistor bridge circuit wherein the diodes of said diode bridge are electrically connected in a parallel and complimentary fashion to said Darlington connected transistors of corresponding bridge legs.

10. A motor control circuit as defined in claim 9 wherein said motor is a camera platform driving motor.

11. A motor control circuit as defined in claim 9, further comprising a second set of like elements for controlling a second motor adapted to drive the same object as said first motor.

12. A motor control circuit as defined in claim 11 wherein said driven object is a camera means.

13. A method for controlling a D.C. electric motor, including the steps of:
controlling the potential difference between a common base connection of a pair of complimentary transistors and the common emitter connection of said transistors for turning individual ones of said complimentary transistors on and off in a mutually exclusive fashion and causing each of said transistors, when conducting, to conduct proportionally to the differential voltage; and
causing complimentary Darlington switching amplifiers, each creating one leg of an "H" switching bridge, to conduct proportionally to an associated transistor of said complimentary transistor pair whereby the speed and direction of the motor is controlled as a function of the difference in potential between the common base and emitter connections of said complimentary transistor pair.

14. A method of controlling a D.C. motor as defined in claim 4, further comprising the steps of electrically connecting said motor to the motor power source via a diode bridge network including diodes poled so that electrical current produced when the motor is coasting is coupled to the power source as a charging current.

15. A method of controlling a motor as defined in claim 13, including an identical set of steps for controlling a second motor.

16. A method of controlling a motor as defined in claim 14, including an identical set of steps for controlling a second motor.

* * * * *